US008804530B2

(12) United States Patent
Hamel et al.

(10) Patent No.: US 8,804,530 B2
(45) Date of Patent: Aug. 12, 2014

(54) SYSTEMS AND METHODS FOR GATEWAY RELOCATION

(75) Inventors: Eric Hamel, Paris (FR); Mark Grayson, Maidenhead (GB); Kevin Shatzkamer, Hingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 238 days.

(21) Appl. No.: 13/333,561

(22) Filed: Dec. 21, 2011

(65) Prior Publication Data

US 2013/0163434 A1    Jun. 27, 2013

(51) Int. Cl.
  *H04W 4/00*      (2009.01)
(52) U.S. Cl.
  USPC ........................................ 370/237
(58) Field of Classification Search
  CPC .. H04W 36/36; H04W 36/22; H04W 36/0027
  See application file for complete search history.

(56) References Cited

U.S. PATENT DOCUMENTS

| | | | |
|---|---|---|---|
| 6,917,592 B1 | 7/2005 | Ramankutty et al. | |
| 8,064,909 B2 | 11/2011 | Spinelli et al. | |
| 2005/0239473 A1 | 10/2005 | Pan et al. | |
| 2007/0116019 A1 | 5/2007 | Cheever et al. | |
| 2007/0116020 A1 | 5/2007 | Cheever et al. | |
| 2007/0253328 A1 | 11/2007 | Harper et al. | |
| 2008/0108367 A1* | 5/2008 | Afrashteh et al. | 455/452.2 |
| 2008/0137541 A1 | 6/2008 | Agarwal et al. | |
| 2008/0316980 A1 | 12/2008 | Ahlen et al. | |
| 2009/0305707 A1 | 12/2009 | Pudney | |
| 2010/0124933 A1 | 5/2010 | Chowdhury et al. | |
| 2011/0058479 A1 | 3/2011 | Chowdhury | |
| 2011/0075557 A1 | 3/2011 | Chowdhury et al. | |
| 2011/0075675 A1 | 3/2011 | Koodli et al. | |
| 2011/0096750 A1* | 4/2011 | Velandy et al. | 370/331 |
| 2011/0199898 A1* | 8/2011 | Cho et al. | 370/230 |
| 2012/0071163 A1* | 3/2012 | Klingenbrunn et al. | 455/435.2 |
| 2012/0110197 A1 | 5/2012 | Miklos et al. | 709/228 |
| 2012/0129488 A1 | 5/2012 | Patterson et al. | 455/406 |
| 2012/0140624 A1 | 6/2012 | Denman et al. | 370/230.1 |
| 2012/0252458 A1* | 10/2012 | Ohnishi | 455/436 |

FOREIGN PATENT DOCUMENTS

EP    2317822 A1    5/2011

OTHER PUBLICATIONS

European Search Report for European Patent Application No. 12159084.8 mailed Nov. 12, 2012. 8 pages.
3GPP TS 23.401 V10.5.0. "3rd Generation Partnership Project; Technical Specification Group Services and System Aspects; General Packet Radio Service (GPRS) Enhancements for Evolved Universal Terrestrial Radio Access Network (E-UTRAN) Access (Release 10)." Sep. 2011. 282 pages.
3GPP TR 23.829. V10.0.1. "3rd Generation Partnership Project; Technical Specification Group Services and System Aspects; Local IP Access and Selected IP Traffic Offload (LIPA-SIPTO)(Release 10)." Oct. 2011. 43 pages.

* cited by examiner

*Primary Examiner* — John Blanton
(74) *Attorney, Agent, or Firm* — Wilmer Cutler Pickering Hale and Dorr LLP

(57) ABSTRACT

Network operators have deployed multiple network devices to provide stable data services amid a rapid increase in data traffic. One way to balance data load among the multiple network devices is by distributing the user equipments across the multiple network devices using an explicit detach with reattach required procedure. However, the explicit detach with reattach required procedure can disrupt on-going data services of user equipments. This disclosure provides systems and methods of an enhanced explicit detach with reattach required procedure that reduces disruption of on-going data services due to the explicit detach with reattach required procedure.

20 Claims, 6 Drawing Sheets

SYSTEMS AND METHODS FOR GATEWAY RELOCATION

FIELD OF THE DISCLOSURE

This disclosure relates generally to systems and methods for relocating mobile devices attached to a gateway in a communication network.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology.

The increase in data traffic is straining wireless network operators' existing packet core elements. The increase in data traffic can overload network devices in wireless networks, and it may even cause wireless network service disruptions. The demand for data over wireless networks is not expected to slow, especially as mobile devices become more sophisticated and as users become more dependent on mobile devices.

DESCRIPTION OF EXAMPLE EMBODIMENTS

Overview

Figure 1:
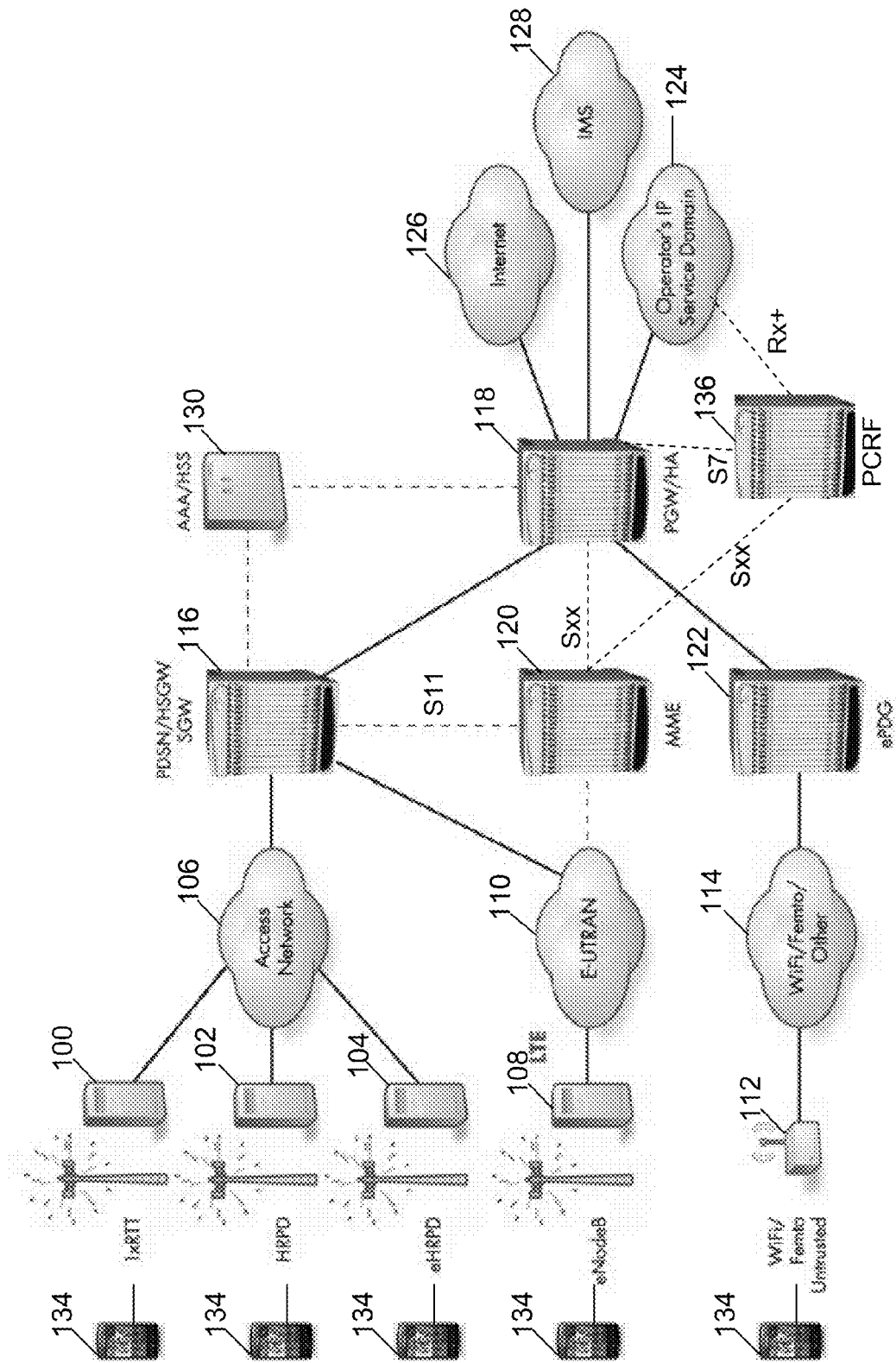
FIGS. 1-2 illustrate a communication network including a long term evolution (LTE) topology in accordance with certain embodiments.

Certain embodiments relate to a method that includes identifying communication sessions associated with a user equipment and identifying network condition information associated with a plurality of gateways, including a serving gateway of the user equipment. The method further includes determining if an explicit detach with reattach required (EDRR) procedure would disrupt the communication sessions by analyzing the communication sessions and the network condition information, and if the EDRR procedure would not severely disrupt the communication sessions, triggering a mobility management entity (MME), associated with the user equipment, to initiate the EDRR procedure for the user equipment.

Example Embodiments

Network operators have addressed the rapid increase in data traffic by installing multiple network devices, for example, gateways in communication networks to handle the data traffic. These network devices are often deployed in a distributed manner so that each network device handles data traffic for a localized region. However, because the amount of data traffic can vary from one geographic location to another, some of the network devices can be overloaded while others are under-utilized. Such a load imbalance would counter the benefits of deploying multiple network devices.

To evenly distribute user equipment to multiple network devices, network operators have devised methods to detach some user equipments from an overloaded network device and reattach the detached user equipments to an under-utilized network device. One of the devised methods is an "explicit detach with reattach required" procedure (EDRR procedure). Load distribution is one embodiment of an operational procedure which includes the EDRR procedure. Other embodiments may relate to alternative procedures, e.g., updating the configuration on an operational network element.

The EDRR procedure is specified in the $3^{rd}$ Generation Partnership Project (3GPP) Technical Specification (TS) 23.401, entitled "Technical Specification Group Services and System Aspects; General Packet Radio Service (GPRS) enhancements for Evolved Universal Terrestrial Radio Access Network (E-UTRAN) access (Release 10)", which is herein incorporated by reference in its entirety. TS 23.401 specifies an EDRR procedure in which a mobility management entity (MME) instructs a user equipment to detach from the network and reattach to the network. When the user equipment reattaches to the network, the MME selects a gateway that would serve the user equipment. The MME is configured to select a gateway that is different from the gateway that previously served the user equipment. This way, the MME can de-anchor a user equipment from a gateway and reattach the user equipment to a new gateway.

One drawback of the EDRR procedure is data service disruption. Because the MME resides on a control plane of a network, the MME is not cognizant of any data transfer activities. Therefore, the MME may reattach a user equipment to a new gateway even if the user equipment is receiving data from the network. When a user equipment detaches from a gateway and reattaches to a new gateway, the new gateway would assign a new Internet Protocol (IP) address to the user equipment. Therefore, if the user equipment had any on-going data communications prior to receiving the EDRR instructions, the user equipment may need to stop the on-going data communications and re-establish them to reflect the new IP address, thereby disrupting on-going data services.

To reduce service disruptions associated with the EDRR procedure, the disclosed systems and methods provide an enhanced EDRR procedure in which the EDRR procedure is triggered by a network device that has access to user plane information. A network device with access to user plane information, also called a user plane (UP) element, is aware of on-going data transfer activities. Therefore, the UP element is capable of deciding when to initiate or defer the EDRR procedure to reduce the disruption of on-going data transfer activities. For example, if a user equipment has a long-lived Transmission Control Protocol (TCP) connection that is likely to be associated with a substantive, important data transfer, the UP element can postpone the EDRR procedure until the long-lived TCP connection is terminated. In other words, the UP element can trigger or delay the EDRR procedure based on how the EDRR procedure would affect ongoing data transfer activities.

A UP element can include a serving gateway (SGW), a packet data network gateway (PGW), a policy charging and rules function (PCRF) receiving data traffic reports from a gateway, or any network devices that are in the user plane. Once the UP element decides to execute the EDRR procedure, the UP element can send a trigger message to the associated MME. The UP element can communicate with the MME over an interface. For example, if the UP element is a SGW, then the UP element can communicate with the MME over a S11 signalling interface. If the UP element is a PGW, then the UP element can communicate with the MME via proxied communication, via the SGW using the S5 and S11 signalling interfaces, or via a newly defined direct interface between the PGW and the MME. This newly defined interface can include an Sxx signalling interface. If the UP element is a PCRF, then the UP element can establish a new signalling interface, i.e., Sxx interface, with the MME communicate with the MME. If the UP element does not have any signalling interface to the MME, the UP element can communicate with the MME using a General Packet Radio Service (GPRS) Tunneling Protocol (GTP).

FIG. 1 illustrates a communication system with parallel networks in accordance with certain embodiments. FIG. 1 includes a number of radio access technologies such as a 1xRTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as Wi-Fi, Femto, WiMAX, or any other radio spectrum technology, can use a transceiver shown generally at 112 to connect a user equipment (UE) 134 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, such as a packet data network gateway (PGW), and a mobility management entity (MME) 120. On the access network side, the anchor gateway 118 can also communicate with an evolved packet data gateway (ePDG) 122 that provides connectivity to the Wi-Fi/Femto/other transceiver 112. On the packet core side, the anchor gateway can communicate with the operator's IP service domain 124, the Internet 126, IP multimedia subsystem (IMS) 128, a data center 132, and a video server 136. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a user equipment. Even when the user equipment 134 is detached from the network, the HSS 130 maintains the binding information until the user equipment 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or network device as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state user equipments, the SGW terminates the down link data path and triggers paging when down link data arrives for the user equipment. The SGW manages and stores user equipment contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

Policy and charging rules function (PCRF) 136 can determine the policy rules associated with subscribers in a communication network. The PCRF 136 can access subscriber databases and charging systems in a scalable manner. The PCRF 136 can communicate with the network operator's IP service domain over an Rx+ interface. The PCRF 136 can also communicate with a PGW 118 over an S7 interface. In certain embodiments, the PCRF 136 can also communicate with an MME over a new signalling interface, referred to as an Sxx interface.

The MME 120 resides in the EPC control plane and manages session states, authentication, paging, mobility with 3GPP 2G/3G nodes, roaming, and other bearer management functions. The MME can be a standalone element or integrated with other EPC elements, including the SGW, PGW, and Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs. The MME 120 can communicate with the SGW 116 over a S11 interface. In certain embodiments, the MME 120 can communicate with a PGW 118 over a new, directly connected interface, including an Sxx signalling interface. In other embodiments, the MME 120 can communicate with a PGW 118 via a SGW over proxied interfaces, S5 and S11. In certain embodiments, the MME 120 can communicate with operator's IP services over an Sxx interface.

The ePDG 122 is responsible for interworking between the EPC and fixed non-3GPP access technologies such as a Wi-Fi, WiMAX access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
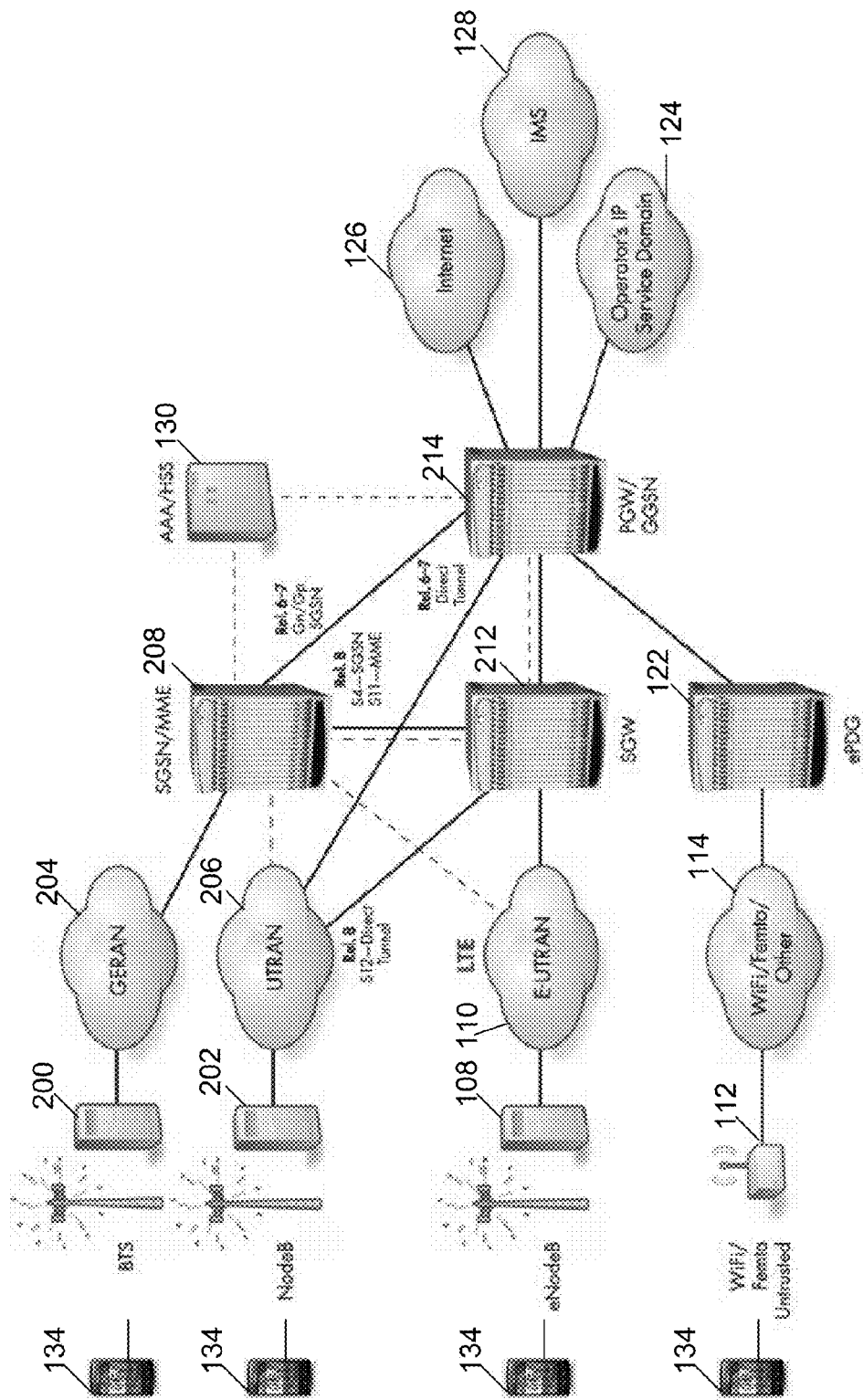

FIG. 2 illustrates a communication system with parallel networks in accordance with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the enhanced EDRR procedure can be implemented, in part, on gateways, such as PGW/HA 118, PDSN/HSGW/SGW 116, SGSN/MME 208, PGW/GGSN 214, or SGW 212. The gateways can access and maintain information relating to the communication session, the subscriber, the radio bearers, and the policies relating to the communication session. The gateways may be used to provide various services to a user equipment 134 and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of delivered to a user equipment. Residing within the gateways can be one or more network processing units, line cards, packet processing cards, system management cards, and interfaces in some embodiments.

Figure 3:
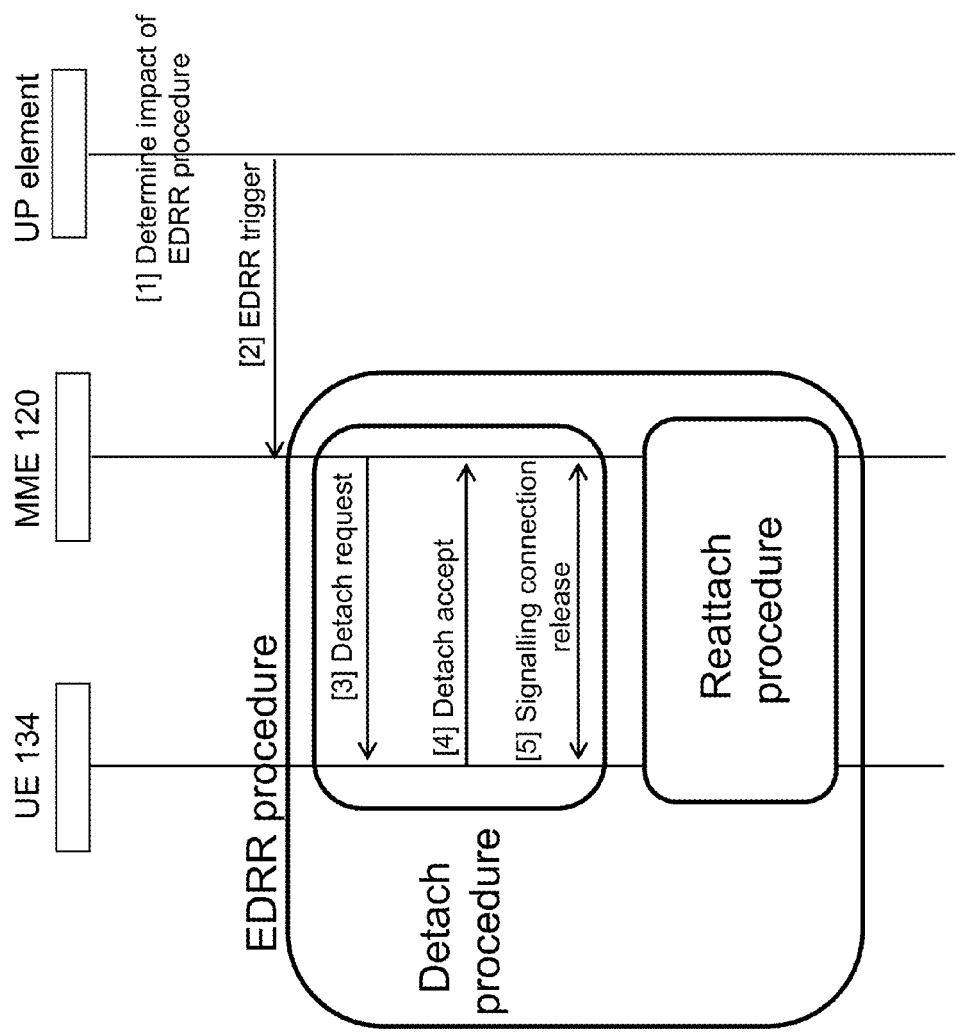
FIG. 3 shows a flow diagram illustrating a gateway relocation mechanism in accordance with certain embodiments.

FIG. 3 illustrates a flow diagram for an enhanced EDRR procedure in accordance with certain embodiments. In an enhanced EDRR procedure, the UP element can monitor the data flows and determine whether to initiate the EDRR procedure or not.

In step 1, the UP element can monitor data flows and determine how an EDRR procedure would affect the network service for a user equipment. Monitoring data flows can include gathering information on the communication sessions associated with a user equipment and/or the current network condition. The UP element can subsequently analyze the gathered information to determine the impact of the EDRR procedure to the user equipment. Analyzing the gathered information can be performed at an analytics module in the UP element. The analytics module can analyze these factors in a variety of ways such as continuously or intermittently.

Analyzing the communication session associated with a user equipment can include determining the types of established communication sessions and the number of established communication sessions. User equipment can establish one or more of the following types of communication sessions: a Transmission Control Protocol (TCP) session, a User Datagram Protocol (UDP) session, a Datagram Congestion Control Protocol (DCCP) session, a Stream Control Transmission Protocol (SCTP) session, or a Resource Reservation Protocol (RSVP) session. The types of established communication sessions and the number of established communication sessions can be determined by querying the serving gateway or by analyzing data packets associated with the established communication sessions.

Determining the types of established communication sessions can be useful because the EDRR procedure impacts certain types of communication sessions more than others. For example, the EDRR procedure can change the IP address associated with a user equipment, which can severely disrupt TCP sessions while only tangentially disrupting other types of sessions. Therefore, if all data communication sessions associated with a user equipment are non-TCP sessions (e.g., UDP sessions), data service disruptions due to the EDRR procedure may only be minor. Determining the number of established communication sessions can also be useful because the EDRR procedure would more severely impact user equipments with many established sessions compared to user equipments with fewer established sessions.

Analyzing the network condition information can include analyzing network congestion information and/or historical data traffic information. The network condition information is applicable to multiple user equipment. Therefore, analyzing the current network condition information can culminate in relocating multiple user equipment to another gateway.

Network congestion information can indicate the amount of data traffic currently being handled by certain network devices or the average data throughput of certain network devices. The network congestion information can also include a gateway status information, indicating if a gateway is overloaded or if a gateway is malfunctioning.

In some embodiments, the analytics module can gather network congestion information from deep packet inspection (DPI) of data flows. Deep packet inspection can include inspecting data flow's level 3, level 4, level 5, level 6, and/or level 7 headers, each defined in accordance with the Open System Interconnection (OSI) model. For example, the network congestion information can be extracted by analyzing a Simple Network Management Protocol (SNMP) message header, by analyzing application level (i.e., level 7) data flows with TCP retransmits, or by analyzing an application level (i.e., level 7) signaling, such as a session initiation protocol (SIP) signaling.

In certain embodiments, the analytics module can receive network congestion information from a session border controller or a service router. In other embodiments, the analytics module can trigger the UP element, in which the analytics module resides, to measure the network congestion information. The measured network congestion information can include the data throughput of the UP element (measured in terms of mega-bits per second) or the number of communication sessions handled by the UP element.

The historical data traffic information can include data traffic statistics measured over a period of time. The analytics module can use the historical data traffic information to proactively initiate the EDRR procedure before any of the network devices becomes overloaded. For example, if an analytics module is aware that 5 PM is a busy hour for a particular gateway, the UP element can initiate the EDRR procedure to proactively relocate certain user equipments to a less-utilized gateway. The historical data traffic information can also include statistics on the location of one or more services often consumed by a particular user equipment. The location of those services can be inferred by analyze the IP address from which the services originate.

In certain embodiments, the analytics module can analyze the above factors to determine the PGW to which the user equipment is to be relocated. Further, in certain embodiments, the analytic module can derive the cost delta for serving a particular user as a result of gateway relocation. Here the cost delta may be related to the reduced cost in terms of resources required to support a given subscriber quality of experience. Alternatively, the cost delta may be directly related to the cost of bandwidth required to support connections to preferred application functions.

The analytics module can analyze one or more of the above factors to determine how the EDRR procedure would impact the communication session of a user equipment. If the determination indicates that the level of disruption is not too severe, the EDRR is initiated. The level of disruption (i.e., the impact of the EDRR on the communication session of the user equipment) can be quantified as a scalar or a vector, and the determination of the severity of the disruption can be based on whether the quantified level of disruption is greater or less than a scalar threshold or a vector threshold.

Different systems could quantify the level of disruption in different ways, and a system could determine it differently based on circumstances. The level of disruption and its severity can be quantified using a mathematical algorithm. In certain embodiments, a mathematical algorithm can assign specific weights to above factors contributing to the network disruption. The mathematical algorithm would then sum the weighted contributions of these factors and apply a function to the weighted sum to quantify the severity of the network service disruption. For example, in some embodiments, the mathematical function can take the form of:

$$s = g\left(\sum_{i=1}^{N} w_i F_i\right)$$

where $F_i$ indicates the service disruption contribution from the $i^{th}$ factor, $w_i$ indicates the weight assigned to the $i^{th}$ factor, N indicates the number of considered factors, $g(\bullet)$ indicates the function applied to the weighted sum of the contributions, and s indicates the quantity that indicates the severity of the network service disruption. If s is less than a predetermined threshold, then the analytics module would indicate that the EDRR would not severely disrupt the user equipment's communication sessions. In some embodiments, weights $w_i$, the function $g(\bullet)$, and the threshold can be configured to satisfy the needs of the communication networks: these can be set by a network operator or a vendor selling the UP element. If the EDRR procedure would not severely disrupt the communication sessions for the user equipment, the UP element can trigger the EDRR procedure for the user equipment.

In step 2, the UP element can send an EDRR trigger message to the MME 120. The EDRR trigger message can include an identifier of the user equipment to be relocated to another gateway. The user equipment's identifier can include the IP address, the International Mobile Subscriber Identity (IMSI), the International Mobile Equipment Identity (IMEI), the MSISDN, or the Mobile Equipment Identifier (MEID). The EDRR trigger message can also include, if applicable, an identifier of an PGW that will serve the user equipment upon reattachment. The PGW identifier can include the IP address of the PGW or the fully-qualified-domain-name (FQDN) of the PGW (e.g., PGW-CA.vz.com).

Once the MME 120 receives the EDRR trigger message, the MME 120 can initiate the EDRR procedure, as disclosed in the 3$^{rd}$ Generation Partnership Project (3GPP) Technical Specification (TS) 23.401. In step 3, the MME 120 analyzes the user equipment's identifier in the EDRR trigger message to identify the user equipment 134 to be reattached. Then, the MME 120 sends a detach request to the equipment 134. In step 4, the user equipment 134 sends a detach accept message to the MME 120. In step 5, the MME 120 releases the S1-MME signaling connection for the user equipment by sending an S1 Release Command message to the eNodeB associated with the user equipment 134. The MME 120 can also communicate with a serving gateway to remove information related to the user equipment's sessions. Subsequently, the user equipment 134 can re-attach to the network to re-establish communication sessions. In certain embodiments, the MME can assign the re-attached user equipment to the PGW identified by the PGW identifier in the EDRR trigger message. This completes the EDRR procedure.

In certain embodiments, the MME can trigger the UP element (or the analytics module therein) to determine if the EDRR procedure would disrupt communication sessions associated with a particular user equipment. For example, the MME can send an evaluation trigger message to the UP element. In response, the UP element can monitor the data traffic to gather information on the communication sessions associated with a user equipment and/or the current network condition. The analytics module in the UP element would subsequently analyze the gathered information to determine whether the EDRR procedure would disrupt on-going communication sessions associated with the particular user equipment. If not, the UP element can trigger the MME to initiate the EDRR procedure, as illustrated in FIG. 3.

In certain embodiments, the analytics module can reside in the MME 120. The UP element can gather data flow information, including information on on-going communication sessions and current network condition. The UP element then sends the data flow information to the MME 120. Subsequently, the analytics module in the MME 120 can analyze the received data flow information to determine how the EDRR procedure would impact on-going communication sessions. If the EDRR procedure would not severely disrupt the communication sessions, the analytics module can trigger the MME 120 to initiate the EDRR procedure, as illustrated in FIG. 3.

In certain embodiments, the analytics module can analyze data flows to identify a group of user equipment with predetermined data consumption characteristics. The data consumption characteristics can include the consumed data content or the originating server of the consumed data content. The analytics module can subsequently trigger the MME 120 to reattach this group of user equipments to the same gateway. For example, the analytics module can perform deep packet inspection of data flows to determine which user equipments are watching the same video. Once the analytics module identifies a group of user equipments watching the same video, the analytics module can trigger the MME 120 to reattach the identified group of user equipments to the same gateway. This way, the new gateway can deliver the video to user equipment in an efficient manner. For example, in some embodiments, the new gateway can multi-cast the video to user equipment. Also, in other embodiments, the new gateway can receive a uni-cast video stream from the video originating server, and split the received uni-cast video stream to multiple uni-cast video streams to user equipment. Such video delivery strategies can save computational power and communication bandwidths, and improve the hit-rate of video cache in the new gateway.

Figure 4:
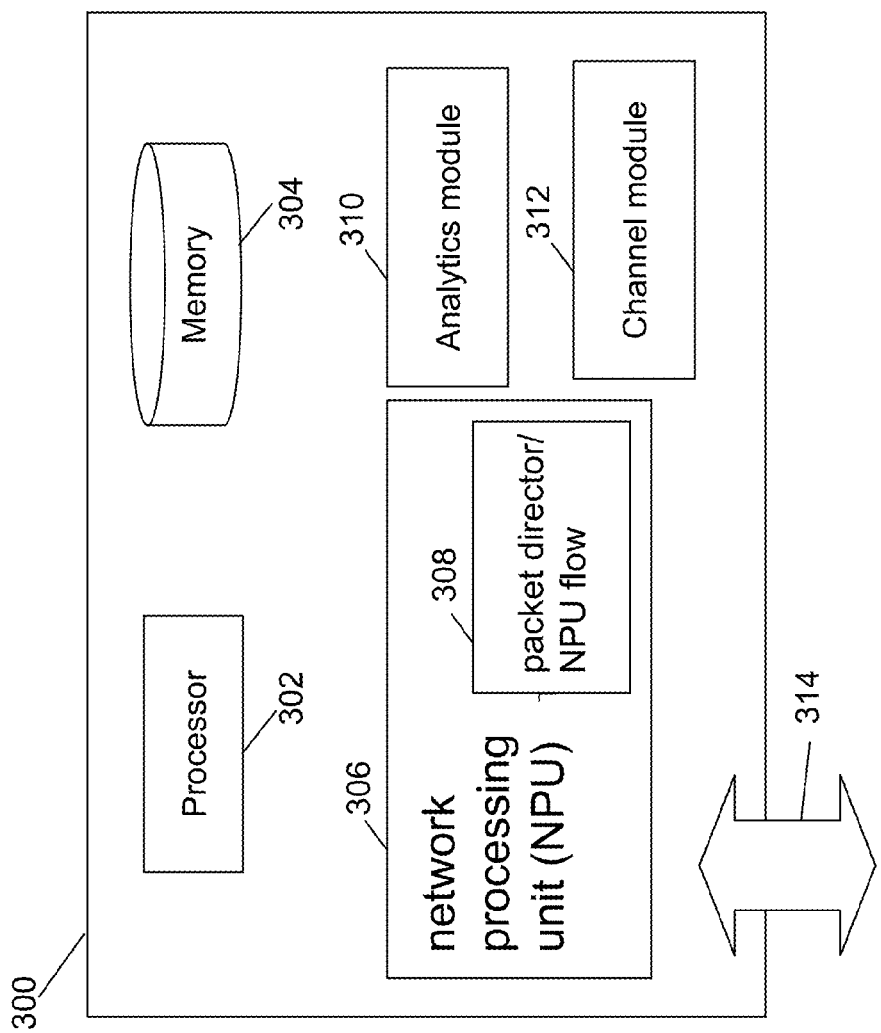
FIG. 4 shows a logical diagram of a user plane (UP) element in accordance with certain embodiments.

FIG. 4 illustrates a logical view of a user plane (UP) element 300 in accordance with certain embodiments. The UP element 300 can include one or more of: a processor 302, a memory 304, a network processing unit (NPU) 306, a packet director/NPU flow 308, an analytics module 310, a channel module 312, and an interface 314.

The analytics module 310 is configured to determine how an "explicit detach with reattach required procedure" (EDRR procedure) would impact on-going network services for a user equipment. To determine the impact of the EDRR procedure, the analytics module 310 can consider data flow information, which includes information on communication sessions associated with a user equipment and/or the current network condition. Based on the analysis, the analytics module 310 can trigger an MME 120 to initiate the EDRR procedure for the user equipment. The analytics module 310 can be implemented in software using the memory 304 such as a non-transitory computer readable medium, a programmable read only memory (PROM), or flash memory. The software can run on a processor 302 that executes instructions or computer code. The analytics module 310 may also be implemented in hardware using an application specific integrated circuit (ASIC), programmable logic array (PLA), or any other integrated circuit.

An interface 314 can provide an input and/or output mechanism to communicate with other network devices, including an MME. In particular, the interface 314 can include the S11 interface or the Sxx interface for communication with the MME. The interface can also include a General Packet Radio Service tunneling protocol (GTP) tunnel for communication with an MME. The interface 314 can also provide communication with gateways and UEs, as well as other core network nodes to send and receive control data. The interface 314 can be implemented in hardware to send and receive signals in a variety of mediums, such as optical, copper, and wireless, and in a number of different protocols some of which may be non-transient and/or non-transitory.

User Equipment and Network Device

The user equipment 134 described above can communicate with a plurality of radio access networks using a plurality of access technologies and with wired communication networks. The user equipment 134 can be a smart phone offering advanced capabilities such as word processing, web browsing, gaming, e-book capabilities, an operating system, and a full keyboard. The user equipment 134 may run an operating system such as Symbian OS, iPhone OS, RIM's Blackberry, Windows Mobile, Linux, Palm WebOS, and Android. The screen may be a touch screen that can be used to input data to the user equipment 134 and the screen can be used instead of the full keyboard. The user equipment 134 may have the capability to run applications or communicate with applications that are provided by servers in the communication network. The user equipment 134 can receive updates and other information from these applications on the network.

The user equipment 134 also encompasses many other devices such as televisions (TVs), video projectors, set-top boxes or set-top units, digital video recorders (DVR), computers, netbooks, laptops, machine-to-machine clients such as a car, an automated teller machine (ATM), and any other audio/visual equipment that can communicate with a network. The user equipment 134 can also keep global positioning coordinates, profile information, or other location information in its stack or memory. The user equipment 134 can have a memory such as a computer readable medium, flash memory, a magnetic disk drive, an optical drive, a programmable read-only memory (PROM), and/or a read-only memory (ROM). The user equipment 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment 134 can also provide a variety of user interfaces such as a keyboard, a touch screen, a trackball, a touch pad, and/or a mouse. The user equipment 134 may also include speakers and a display device in some embodiments.

The analytics module can be implemented, at least in part, in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a Policy and Charging Rule Function (PCRF), a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The offload gateway can be implemented as any combination of the following including an xGSN, an xGW, an xGW-SGW, and an xGW-PGW.

Figure 5:
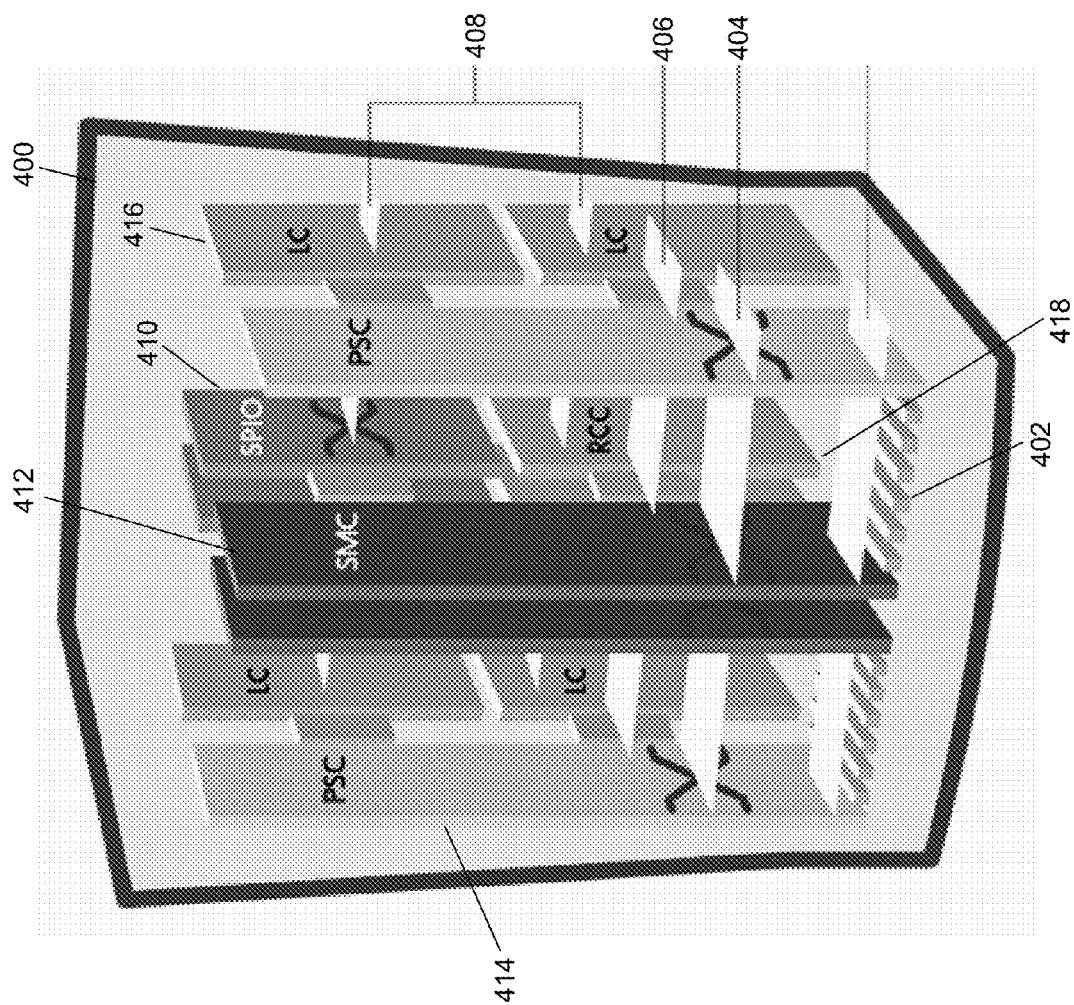
FIG. 5 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 5 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 6:
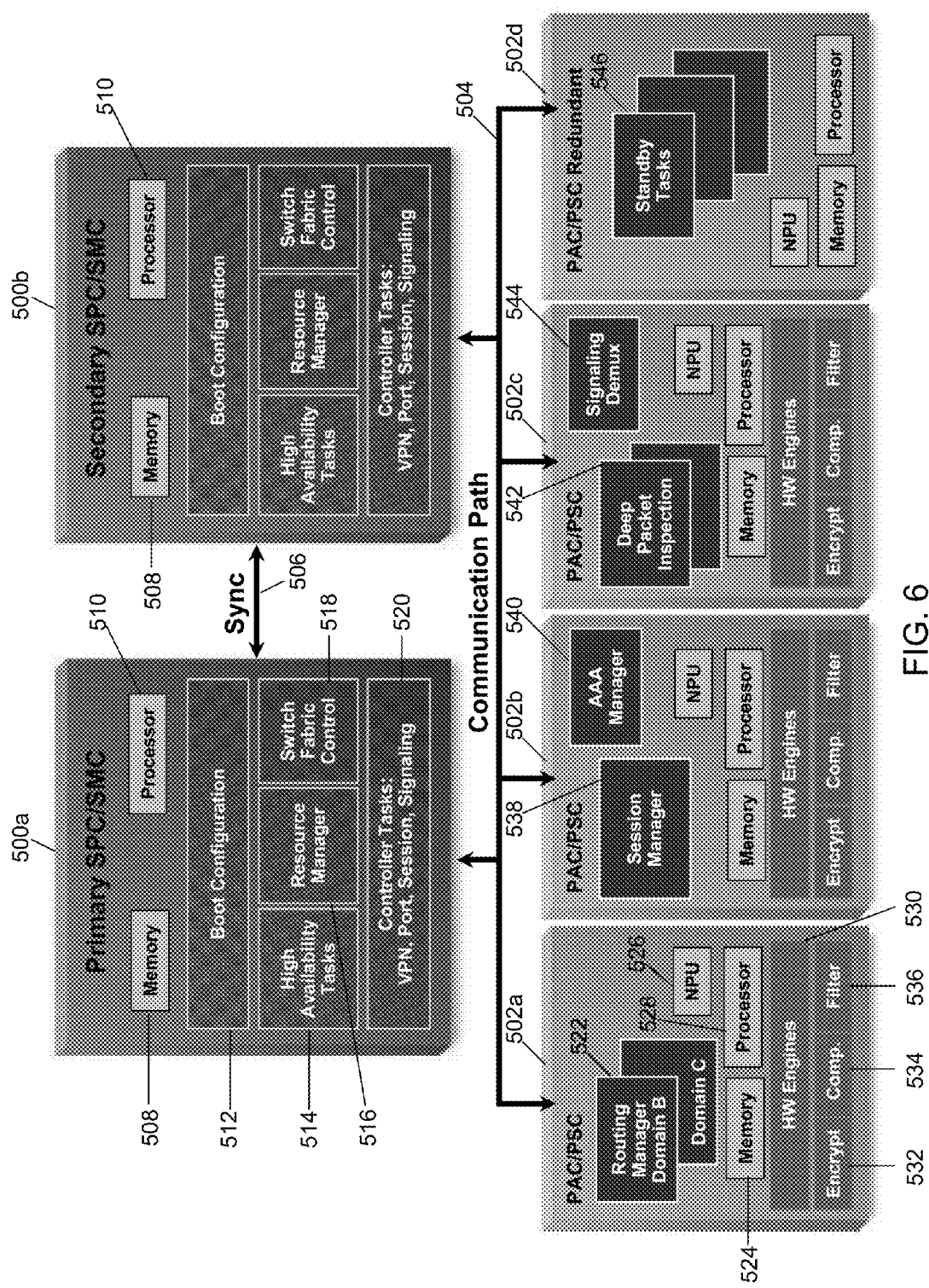
FIG. 6 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 6 illustrates a logical view of the software architecture of a network device in accordance with certain embodiments. As shown, the software and hardware can be distributed within the network device and across different circuit boards, processors, and memory. FIG. 6 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manages and controls the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment 134.

The PAC/PSC 502 is a high-speed processing card that is designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 is also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment 134. A session allows a user equipment 134 to communicate with the network for voice calls and data. The AAA manager 540 manages accounting, authentication, and authorization with an AAA server in the network. PAC/PSC 502 provides a DPI task 542 and a signaling demux 544. The DPI task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the analytics module can reside in an MME 120.

We claim:

1. A method comprising:
   identifying one or more communication sessions associated with a mobile device;
   determining types of the one or more communication sessions and a number of the one or more communication sessions to determine an impact of an explicit detach with reattach required (EDRR) procedure on the one or more communication sessions; and
   based on a determination that the impact does not exceed a threshold, causing a mobility management entity (MME), associated with the mobile device, to initiate the EDRR procedure for the mobile device.

2. The method of claim 1, wherein the one or more communication sessions include one or more of a Transmission Control Protocol (TCP) session, a User Datagram Protocol (UDP) session, a Datagram Congestion Control Protocol (UCCP) session, a Stream Control Transmission Protocol (SCTP) session, or a Resource Reservation Protocol (RSVP) session.

3. The method of claim 1, further comprising identifying a packet data network gateway (PGW) to serve the mobile device upon completion of the EDRR procedure.

4. The method of claim 3, wherein identifying the PGW to serve the mobile device includes computing a cost of attaching the mobile device to the PGW, based on network resource utilization information and consumer experience.

5. The method of claim 1, further comprising receiving, from the MME, a request to determine whether the EDRR procedure would disrupt the one or more communication sessions associated with the mobile device.

6. The method of claim 1, further comprising:
   identifying network condition information associated with a plurality of gateways, including a serving gateway of the mobile device; and
   analyzing the network condition information to determine an impact of an EDRR procedure on the one or more communication sessions.

7. The method of claim 6, wherein analyzing the network condition information includes analyzing network congestion information and historical data traffic information.

8. The method of claim 7, wherein the network congestion information includes a gateway status information, indicating whether any of the plurality of gateways is overloaded or is malfunctioning.

9. The network of claim 7, wherein the historical data traffic information includes a location of one or more services consumed by the mobile device.

10. The method of claim 1, wherein, when all of the one or more communication sessions are non-TCP sessions, indicating that the impact of the EDRR procedure on the one or more communication sessions is below the threshold.

11. A network device comprising:
    one or more interfaces configured to provide communication with a mobile device and a mobility management entity (MME); and
    a processor, in communication with the one or more interfaces, and configured to run a module stored in memory that is configured to:
        identify one or more communication sessions associated with the mobile device,
        determine types of the one or more communication sessions and a number of the one or more communication sessions determine an impact of an explicit detach with reattach required (EDRR) procedure on the one or more communication sessions, and
        cause a mobility management entity (MME) to initiate the EDRR procedure for the mobile device.

12. The network device of claim 11, wherein the module is further configured to:
    identify a group of mobile devices with predetermined data consumption characteristics; and
    cause the MME to attach the identified group of mobile devices to a single gateway.

13. The network device of claim 11, wherein the module is configured to identify a packet data network gateway (PGW) to serve the mobile device upon completion of the EDRR procedure.

14. The network device of claim 11, wherein the module is further configured to:
    identify network condition information associated with a plurality of gateways, including a serving gateway of the mobile device; and
    analyze the network condition information to determine an impact of an EDRR procedure on the one or more communication sessions.

15. The network device of claim 14, wherein the module configured to analyze the network condition information includes a module configured to analyze network congestion information and historical data traffic information.

16. The network device of claim 15, wherein the module is further configured to identify the network congestion information via deep packet inspection (DPI) of data flows.

17. Logic encoded on one or more non-transitory media for execution and when executed operable to:
  identify one or more communication sessions associated with a mobile device;
  determine types of the one or more communication sessions and a number of the one or more communication sessions to determine an impact of an explicit detach with reattach required (EDRR) procedure on the one or more communication sessions; and
  based on a determination that the impact does not exceed a threshold, cause a mobility management entity (MME), associated with the mobile device, to initiate the EDRR procedure for the mobile device.

18. The logic of claim 17, wherein the logic is further operable to:
  identify network condition information associated with a plurality of gateways, including a serving gateway of the mobile device; and
  analyze the network condition information to determine an impact of an EDRR procedure on the one or more communication sessions.

19. The logic of claim 18, wherein the logic operable to analyze the network condition information includes logic operable to analyze network congestion information and historical data traffic information.

20. The logic of claim 19, wherein the logic is further operable to identify the network congestion information via deep packet inspection (DPI) of data flows.

* * * * *